United States Patent
Shin et al.

(10) Patent No.: US 6,597,778 B1
(45) Date of Patent: Jul. 22, 2003

(54) METHOD FOR SETTING A NUMBER PLAN AND PROVIDING A SERVICE FOR AN ADVANCED INTELLIGENT NETWORK SUBSCRIBER IN A COMMUNICATION NETWORK

(75) Inventors: Eun Soo Shin, Kyungki-Do (KR); Jae Ho Joung, Kyungki-Do (KR)

(73) Assignee: LG Information & Communication, Ltd., Seoul (KR)

( * ) Notice: Subject to any disclaimer, the term of this patent is extended or adjusted under 35 U.S.C. 154(b) by 0 days.

(21) Appl. No.: 09/469,306

(22) Filed: Dec. 22, 1999

(30) Foreign Application Priority Data

Dec. 24, 1998 (KR) ........................................ 1999-57911

(51) Int. Cl.[7] .......................... H04M 3/42; H04M 7/00
(52) U.S. Cl. ........................ 379/207.02; 379/201.02; 379/221.08; 379/901
(58) Field of Search ................. 379/201.01, 201.02, 379/207.02, 221.08, 221.09, 221.1, 221.12, 221.14, 221.15, 230, 901

(56) References Cited

U.S. PATENT DOCUMENTS

| | | | | |
|---|---|---|---|---|
| 5,553,130 A | * | 9/1996 | Turner | 379/221.08 |
| 5,768,358 A | * | 6/1998 | Venier et al. | 379/221.09 |
| 5,892,821 A | * | 4/1999 | Turner | 379/207.15 |
| 6,175,622 B1 | * | 1/2001 | Chiniwala et al. | 379/219 |
| 6,453,035 B1 | * | 9/2002 | Psarras et al. | 379/220.01 |

\* cited by examiner

Primary Examiner—Harry S. Hong
(74) Attorney, Agent, or Firm—Fleshner & Kim, LLP

(57) ABSTRACT

A method for setting a number plan and providing a service for an advanced intelligent network (AIN), includes the steps of searching a first trigger which corresponds to a detected AIN call, judging whether the first trigger is a second trigger for a subscriber group, searching subscriber group information of the first trigger when the first trigger is the second rigger and detecting an identification number of a PNP(Private Numbering Plan), searching a PNP corresponding to the identification number from a NTT(Number Translation Table) of the first trigger, and gathering an additional number based on number gathering information of the searched PNP and performing a number translation based on corresponding PNP, thereby setting a certain number plan by the subscriber group and providing a subscriber-based advanced intelligent network service.

23 Claims, 3 Drawing Sheets

| GRP | PFX | MIN | MAX | EOD | EOD M/O | LENG | RESTRICT |
|---|---|---|---|---|---|---|---|
| 1 | 2 | 3 | 10 | # | M | LE4 | T |
| 2 | 9 | 7 | 14 | − | − | − | F |
| 3 | 5 | 3 | 10 | # | M | − | T |
| 4 | FDTO | − | − | − | − | − | T |
| 5 | DEFAULT | 3 | 20 | − | − | − | T |
| 6 | 4 | 6 | 15 | # | O | − | T |

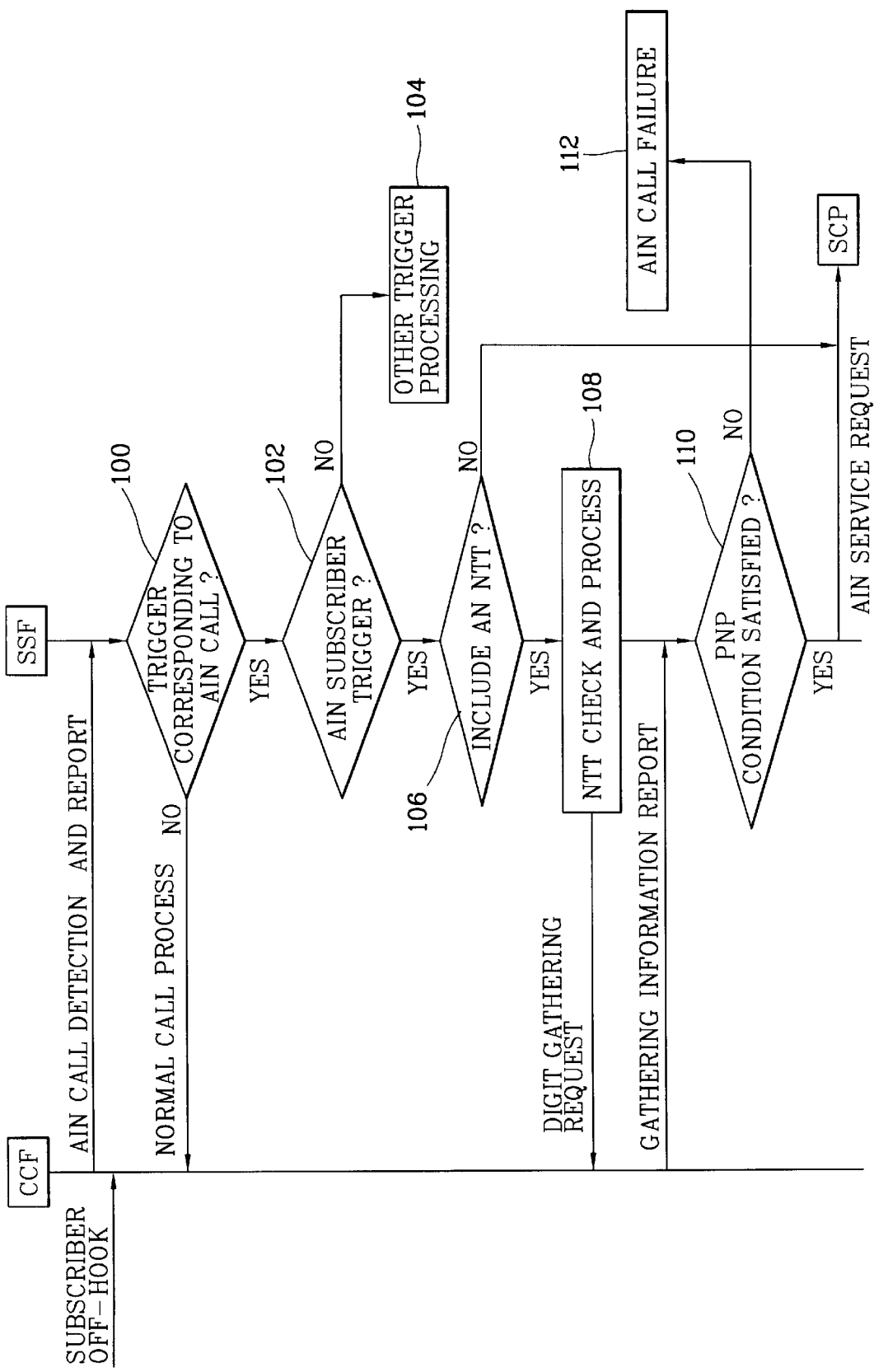

METHOD FOR SETTING A NUMBER PLAN AND PROVIDING A SERVICE FOR AN ADVANCED INTELLIGENT NETWORK SUBSCRIBER IN A COMMUNICATION NETWORK

BACKGROUND OF THE INVENTION

1. Field of the Invention

The present invention relates to a service processing procedure for an Advanced Intelligent Network (AIN), and in particular to a method for setting a number plan and Providing a service for an AIN service subscriber in a communication network.

2. Background of the Related Art

Generally, a switching system requires a certain hardware and software for implementing an optimized operation of its own service purpose. As a result, when adding a new function or new service to the switching system, a large part of the hardware and software should be changed. Usually, upgrading the switching system requires much time and cost. In order to overcome the above-described problems, in the current telephone communication network, an AIN (Advanced Intelligent Network) is widely used instead of the conventional IN(Intelligent Network).

The AIN is an architectural concept that provides for the real-time execution of network services and customized applications in a distributed environment having interconnected computers and switching systems. AIN aims to ease the introduction of new services (i.e. Universal Personal Telecommunication UPT, Virtual Private Network VPN, etc.) based on greater flexibility and new capabilities). Therefore, the AIN is capable of decreasing time and cost required for designing and implementing a new service and easily enhancing the performance of the switching system based on a rapidly changing computer-related technology.

FIG. 1 illustrates a schematic view of the related art AIN system. The AIN system includes multiple service switching points(SSP) 11-1~11-n, and a service control point(SCP) 12. The SSPs 11-1~11-n are connected with a plurality of stations via telephone lines 5 and connected with the SCP 12 via SS7 links 50. In addition, the SSPs 11-1~11-n are connected to each other via a trunk(not shown) for transmitting a certain communication signal such as voice and/or data signals.

Each of the SSPs 11-1~11-n is a network element which detects an AIN service and executes the switching function controlled by the SCP. Namely, the SSPs 11-1~11-n each detect an AIN service at an initial stage and generate a query for a service operation and perform a corresponding AIN service in accordance with a service control instruction of the SCP 12. In addition, the SSPs 11-1~11-n each perform a basic call processing function, which is generally performed by a common switching system, such as monitoring the functioning of subscriber lines, trunks (calling and/or called), and a connection to a communication path. Therefore, the SSPs 11-1~11-n each include a call control function(CCF) and a service switching function(SSF) as a mandatory function.

The SCP 12 is a physical network element which controls AIN services. When an AIN service is detected by the SSPs 11-1~11-n and that event is reported to the SCP from the SSP, the SCP 12 performs a proper predefined service logic and generates a service control instruction to the SSPs 11-1~11-n.

The operation of the AIN system will be explained which reference to the accompanying drawings. Since the SSPs 11-1~11-n all operate in the same manner, for a simplification, the operation of only the SSP 11-1 will be explained. A call can be simply classified as one which requires a service request query from the SSP 11-1 to the SCP 12, or as a normal call which is processed by only the SSP 11-1.

When a call is initiated by a subscriber, the SSP 11-1 can detect whether the corresponding call is an AIN call or not. Namely, when a call is initiated by an AIN service subscriber, the CCF(Call Control Function) of the SSP 11-1 recognizes the call as an AIN call with reference to the AIN trigger data and transfers to the SSF(Service Switching Function) based on a certain process. In addition, if the call of the service subscriber is not an AIN call, the SSP 11-1 processes the call based on a basic call process procedure.

The SSF compares the related call data with each criteria of triggers and checks whether there is a marched trigger which corresponds to the AIN call. At this time, in the SSP 11-1, a route identification number, a service access code, an AIN prefix, etc. are set as a related trigger. As a result of the search, if the AIN call corresponds to one trigger among the service access code and AIN prefix, the SSP 11-1 generates a certain query, which is required for a corresponding service, to the SCP 12. As a result, a certain logic of the SCP 12 is performed in accordance with a service query of the SSP 11-1, and the SCP 12 generates a service control instruction to the SSP 11-1. Therefore, the SSP 11-1 performs a corresponding AIN service in accordance with a service control instruction from the SCP 12.

However, in the AIN system, since the number inputted by the subscriber is used based on an entire number plan of a public network, in the number plan between the AIN subscribers or small groups, a special number which is nor duplicated within the number plan of the public network must be used. Therefore, in the conventional art, an AIN service subscriber can not set his number plan by the group, due to the above-described numbering plan limitation.

SUMMARY OF THE INVENTION

An object of the invention is to solve at least the above problems and/or disadvantages and to provide at least the advantages described hereinafter.

Accordingly, it is an object of the present invention to provide setting of a number plan.

Another object of the present invention is to provide a service for an advanced intelligent network service subscriber.

A further object of the present invention is to set a certain number plan by the subscriber group and provide a subscriber-based advanced intelligent network service.

To achieve the above objects, there is provided a method for setting a number plan and providing a service for an advanced intelligent network(AIN) service subscriber according to a first embodiment of the present invention. The first embodiment of the present invention includes recognizing an AIN(Advanced Intelligent Network) call with reference to an advanced intelligent network trigger data, comparing the recognized AIN call information and a trigger criteria and searching an AIN trigger, judging whether the searched AIN trigger is an AIN subscriber trigger, and searching a subscriber group information of the AIN subscriber trigger when the searched AIN trigger is an AIN subscriber trigger and requesting a number gathering and AIN service.

To achieve the above objects, there is provided a method for setting a number plan and providing a service for an AIN subscriber which includes the steps of searching a trigger which corresponds to a detected AIN call, judging whether the trigger is an AIN subscriber trigger, checking whether a NTT(Number Translation Table) exists in the AIN subscriber trigger, searching a subscriber group information of the AIN subscriber trigger when there is the NTT and detecting an identification number of a PNP(Private Numbering Plan), and searching a PNP corresponding to the detected PNP identification number from the NTT and requesting a number gathering and AIN service based on a number gathering information of the searched PNP.

It is an object of the invention to provide a method for providing a service for an advanced intelligent network (AIN) service subscriber based on a prescribed numbering plan, comprising the steps of (1) recognizing an AIN call by recognizing an AIN trigger; (2) comparing the AIN trigger of the recognized AIN call with AIN trigger criteria; (3) judging whether the AIN trigger is an AIN subscriber trigger; and (4) searching subscriber group information of the AIN subscriber trigger when the AIN trigger is an AIN subscriber trigger and requesting a number gathering and AIN service.

It is a further object of the invention to provide a method for providing a service for an advanced intelligent network (AIN) service subscriber based on a prescribed numbering plan, comprising the steps of (1) searching a trigger which corresponds to a detected AIN call; (2) judging whether the trigger is an AIN subscriber trigger; (3) checking whether a Number Translation Table (NTT exists in the AIN subscriber trigger; (4) searching a subscriber group information of the AIN subscriber trigger when the NTT exists and detecting a Private Numbering Plan (PNP) identification number; and (5) searching a PNP corresponding to the detected PNP identification number from the NTT and requesting a number gathering and AIN service based on a number gathering information of the searched PNP.

It is a further object of the invention to provide a method of setting a private numbering plan for each of a plurality of groups of subscribers in an advanced intelligent network, the setting of the private numbering plan for each group comprising the steps of: (1) setting an identification number of the private numbering plan; (2) setting a first code which represents a call number; (3) setting a minimum number of gathered digits and a maximum number of gathered digits; (4) setting an end-digit; (5) setting a second code which represents whether an input of the end-digit is mandatory; (6) setting a critical digit length for judging as an AIN call; and (7) setting a flag which represents which of an AIN call and a normal call is processed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims

BRIEF DESCRIPTION OF THE DRAWINGS

The invention will be described in detail with reference to the following drawings in which like reference numerals refer to like elements wherein:

FIG. 4 is a flow chart illustrating an AIN service process procedure for an AIN network according to the present invention.

DETAILED DESCRIPTION OF PREFERRED EMBODIMENTS

Figure 1:
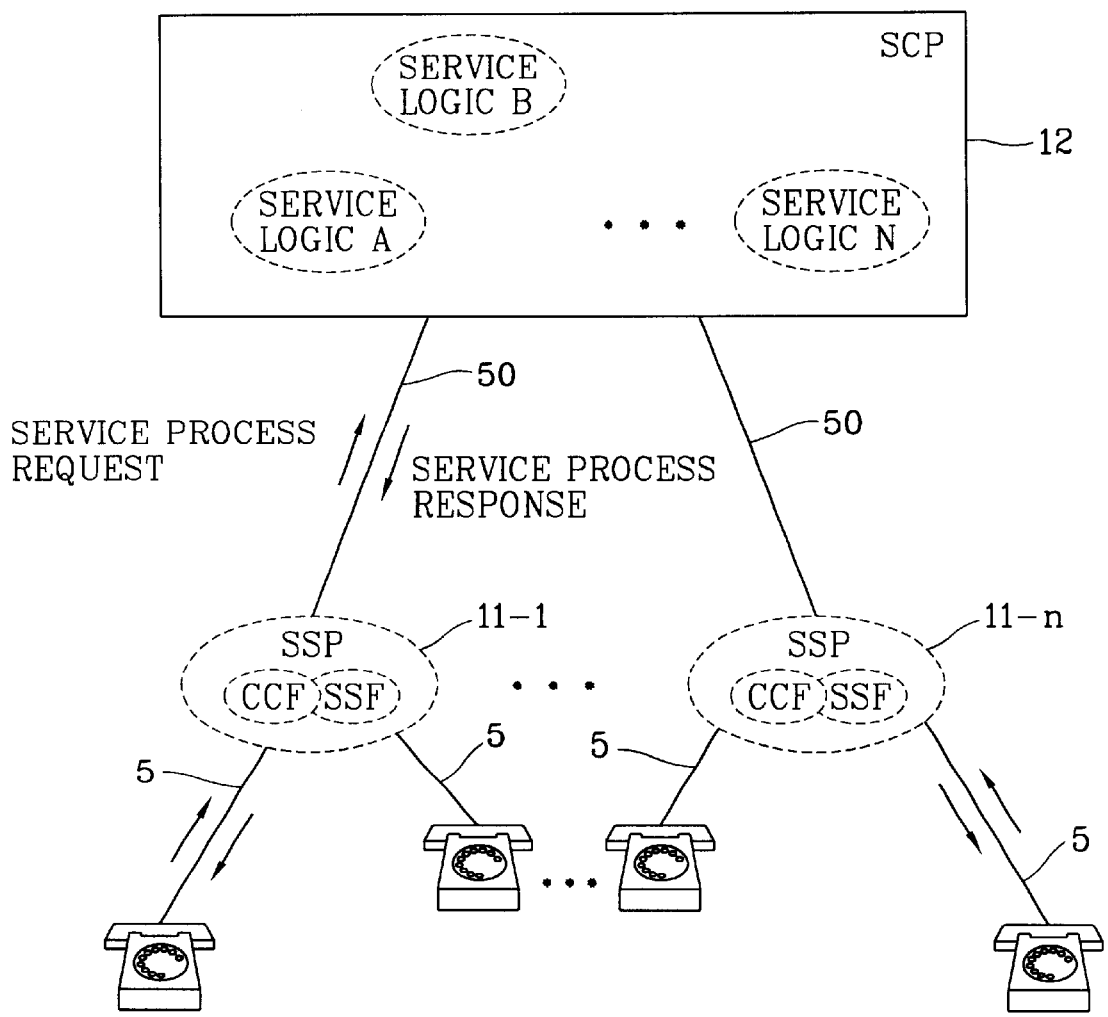
FIG. 1 is a view illustrating a background AIN(Advanced Intelligent Network)
Figures 2, 3:
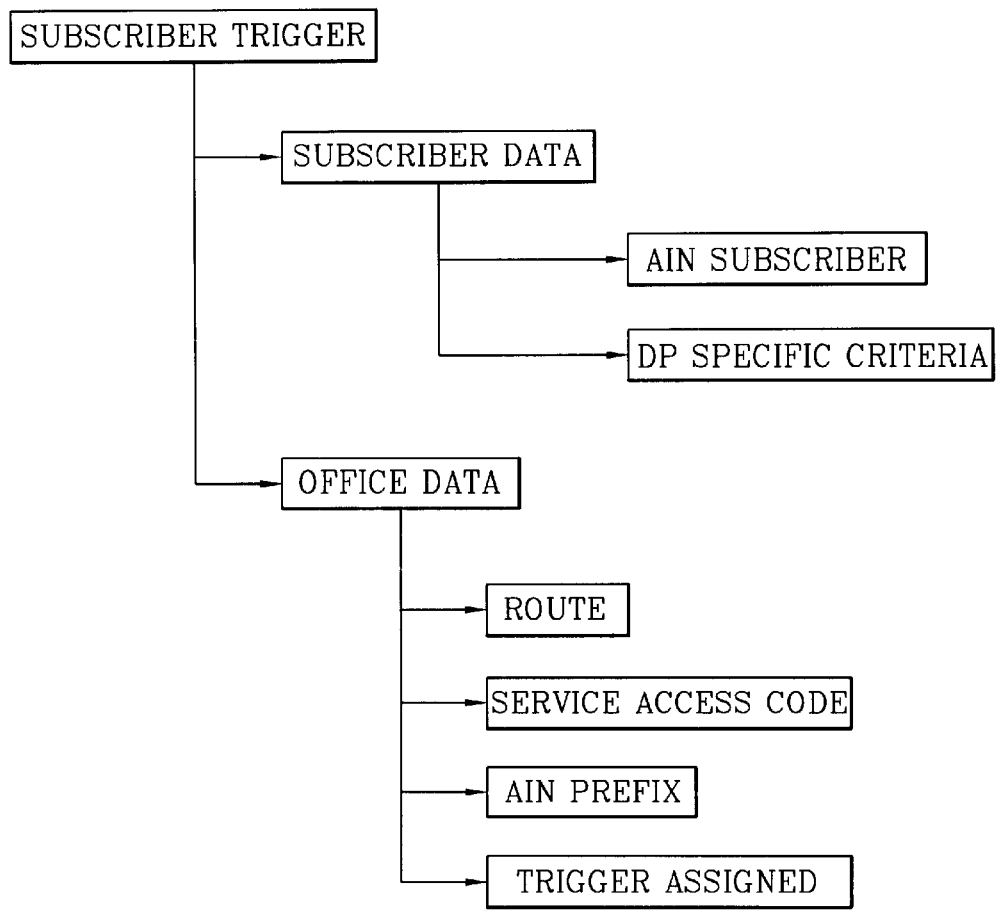
FIG. 2 is a view illustrating the types of subscriber triggers according to the present invention.
FIG. 3 is a view illustrating an example of a number translation table which is selectively included in an AIN subscriber trigger of FIG. 2 according to the present invention.

In the Advanced Intelligent Network (AIN), a trigger represents a detection point and condition of an AIN service. Therefore, the detection capability of a support service is determined based on satisfying the type of trigger set. As shown in FIG. 2, for a subscriber data, an AIN subscriber trigger and a detecting point(DP) specific trigger are used, and for an office data, a trigger assigned trigger is additionally used, including another trigger(route identification number, service access code and AIN prefix).

The AIN subscriber trigger is defined based on an identification number of a PNP (Private Numbering Plan) with respect to a subscriber group and a DP which corresponds to the PNP identification number. In addition, the DP specific trigger is defined based on data and a DP which are capable of searching a trigger in accordance with a corresponding subscriber group when the PNP is not used. The trigger assigned trigger is a DP criteria which is processed by the unit of line, trunk, group, or office. In the above-described trigger, the present invention relates to an AIN subscriber trigger and an operation thereof.

The PNP is defined in the NTT(Number Translation Table) based on each identification number. The NTT is a table which is selectively included in the subscriber trigger as a trigger criteria and is implemented in a database of the SSP, the contents of the same are added, changed, or deleted in accordance with an instruction of an operator.

FIG. 3 is a view illustrating an example of the NTT which includes a plurality of PNPs. The NTT is formed of an identification item GRP of PNP, a start digit PFX, a minimum gathering digit length MIN, a maximum gathering digit length MAX, an end-digit EOD, EOD M/O, a logical length LENG and a restrict.

The identification item GRP represents the type of a PNP which is defined for each subscriber or each subscriber group, the start digit PFX represents an initial input digit of the number, and the minimum gathering digit length MIN and the maximum gathering digit length MAX represent the number of the gathering digits. The end digit EOD represents an input of the end-digit (e.g. "#"). The EOD M/O represents a flag which represents whether the input of the end digit EOD is a mandatory input M or not O. In addition, the logical length LENG represents a judgment digit length for judging a certain call as an AIN call, and the restrict represents a flag on whether an AIN call process or a normal call process is performed.

The method for setting a number plan by the unit of the subscriber groups and providing a service according to the present invention will be explained with reference to the accompanying drawings. As shown in FIG. 4, when an AIN subscriber is off hook, the CCF of the SSP recognizes an AIN call with reference to the AIN trigger data and gathers a certain digit(1–3 digits) and reports to the SSF(Service Switching Function). The SSF compares the inputted digit with the trigger criteria and searches whether there is a trigger which corresponds to the AIN call in Step 100. At this time, it is assumed that the trigger which corresponds to the AIN call is T1. At this time, the trigger T1 is either the route ID trigger, service access code trigger, AIN prefix trigger, AIN subscriber trigger detecting point specific trigger, or trigger assigned trigger.

If there is not a trigger T1 corresponding to the AIN call, the SSF controls the CCF to perform a normal call process. If there is a trigger T1 corresponding to the AIN call, the subscriber group information of the trigger T1 is searched, and then it is checked whether a corresponding trigger T1 is an AIN subscriber trigger in Step 102. As a result of the check, if the trigger T1 is the route identification number, service access code, or AIN prefix, the trigger is processed in the same manner as the conventional technique.

If the trigger T1 is the detecting point specific trigger or trigger assigned trigger, the SSF requests an AIN service to the SCP. If the trigger T1 corresponds to the AIN subscriber trigger, it is checked whether a corresponding AIN subscriber trigger includes an NTT in Step 106. As a result of the check, if the AIN subscriber trigger does not include the NTT, the SSF directly requests the SCP for an AIN service.

In the case that the NTT is included, the SSF detects a PNP identification number of a corresponding AIN subscriber from the subscriber group information of the AIN subscriber trigger. In addition, an identification item GRP of the NTT which corresponds to the detected PNP identification number is recognized and the information with respect to the minimum gathering digit length MIN, the maximum gathering digit length MAX, and the end-digit EOD is transferred to the CCF and requests a number gathering operation in Step 108.

When a gathering number is received from the CCF, the SSF checks whether the gathered number of the AIN call corresponds to each condition of the PNP which corresponds to the identification item GRP in Step 110. When the AIN call satisfies all conditions of the PNP, an AIN service request is sent to the SCP. However, when the AIN call does not satisfy the defined condition, the SSF processes an AIN call as a failure of AIN service detection and instructs the CCF to perform a common call process and to end the operation in Step 112.

The above-described procedure will be explained in detail with reference to the NTT of FIG. 3. The SSF detects a PNP identification number of the AIN subscriber from a subscriber group information of the trigger of the AIN subscriber trigger and searches the identification item GRP of the NTT which corresponds to the PNP identification number and searches one PNP of the AIN subscriber. If one PNP is searched, the SSF transfers the minimum gathering digit length MIN, the maximum gathering digit length MAX, the end-digit EOD(End Of Digit) in the PNP to the CCF and requests number gathering operation. When an additional number is transferred from the CCF, it is checked whether a corresponding AIN call satisfies the condition defined in the PNP. The following will show an example usage of the NTT.

1) If the searched PNP identification number is "1" (first PNP), and the first input number(prefix) of the subscriber is "2", the SSF transfers "MIN=3, MAX=10, EOD=#" of the first identification item GRP to the CCF for thereby requesting an additional number gathering operation, and when "#" which is the end-digit EOD is inputted, the CCF transfers the gathered number to the SSF. When an additional number is gathered from the CCF, since the logical length LENG is set to "LE4(Less Than or Equal to 4)", the SSF judges that each condition of the first PNP is satisfied when the call, which starts with "2", is 3 or 4 digits including the last number EOD and requests an AIN service to the SCP. In the case of more than 4 digits, the normal call process is requested, and the call which start with "2" may have 10 digits max.

2) It the PNP identification number is "2"(second PNP), and the prefix is "9", the SSF transfers "MIN=7, MAX=14" in the second identification item(GRP) to the CCF and gathers an additional number from the CCF. As a result of the number gathering operation, if the call which starts with "9" has a number of minimum 7 digits to maximum 14 digits, it is judged that each condition of the second PNP is satisfied, and an AIN service is requested to the SCP. If the call which starts with "9" is less than 7 digits, the SSF controls the CCF to perform the normal call process Since the current restrict is set as "F", the CCF does nor request the AIN service to the SCP and controls the CCF to perform a normal call process.

3) If the PNP identification number is "3"(third PNP), and the prefix is "5", the SSF gathers an additional number based on the above-described manner. If the call which starts with "5" is in a range of minimum 3 digits to maximum 10 digits, including the end-digit EOD, it is judged that each condition of the third PNP is satisfied, and the SSF requests an AIN service to the SCP.

4) If the PNP identification number is "4"(fourth PNP), and the prefix is the first digit time out(FDTO), it means that the subscriber does not input a first digit for a certain period after the off-hook. In this case, the SSF judges that each condition of the fourth PNP is satisfied and then requests an AIN service to the SCP.

5) If the identification number of the PNP is "5"(fifth PNP), and the prefix is default, when the digit first inputted by the subscriber is the number except for the AIN identification number(PFX), when the call is in a range of more than minimum 3 digits to maximum 20 digits, it is judged that a corresponding call satisfies each condition of the fifth PNP, so that an AIN service is requested to the SCP.

6) If the identification number of the searched PNP is "6"(sixth PNP), and the first input number of the subscriber is "4", the SSF gathers an additional number from the CCF and when the call which starts with "4" has a number of minimum 6 digits to maximum 25 digits, an AIN service is requested to the SCP. At this time, since the EOD M/O is set to "O", the SSF checks whether a corresponding AIN call satisfies each condition of the sixth PNP even when the "#" which is the end-digit (EOD) is not inputted.

As described above, the present invention includes a table provided with a PNP(Private Numbering Plan) as a trigger criteria of an AIN subscriber trigger, so that it is possible to set a number plan for each subscriber group compared to the other number plan system in which a limited number plan is provided. In the present invention, it is possible to allocate a certain number to a subscriber who registered for an AIN service, thereby providing, a subscriber based AIN service.

The foregoing embodiments and advantages are merely exemplary and are not to be construed as limiting the present invention. The present teaching can be readily applied to other types of apparatuses. The description of the present invention is intended to be illustrative, and nor to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for providing a service for an advanced intelligent network (AIN) service subscriber based on a prescribed number plan, comprising:

recognizing an AIN call by recognizing an AIN trigger;

comparing the AIN trigger of the recognized AIN call with AIN trigger criteria;

judging whether the AIN trigger is an AIN subscriber trigger; and searching subscriber group information of the AIN subscriber trigger when the AIN trigger is an AIN subscriber trigger and requesting a number gathering and AIN service.

2. The method of claim 1, wherein the AIN trigger is one of a route identification number, a service access code, an AIN prefix, an AIN subscriber trigger, a detecting point specific trigger and a trigger assigned trigger.

3. The method of claim 2, wherein the AIN subscriber trigger and detecting point specific trigger correspond to a subscriber data, and the trigger assigned trigger corresponds to an office data.

4. The method of claim 2, when the AIN trigger is one of a detecting point specific trigger and a trigger assigned trigger, further comprising requesting an AIN service.

5. The method of claim 1, wherein the number gathering and AIN service requesting comprises:

searching the subscriber group information of the AIN subscriber trigger and detecting a Private Numbering Plan (PNP) identification number;

searching a PNP corresponding to the detected PNP identification number from a Number Translation Table (NTT); and gathering an additional number based on number gathering information of the searched PNP and requesting an advanced intelligent network service.

6. The method of claim 1, wherein the AIN subscriber trigger comprises:

an identification number of a Private Numbering Plan (PNP); and a detecting point corresponding to the identification number of the PNP.

7. The method of claim 6, wherein a Number Translation Table (NTT) is selectively included in the AIN subscriber trigger.

8. The method of claim 7, wherein the NTT comprises:

a first item which represents an identification number of the PNP;

a second item which represents a call number;

a third item which represents a minimum number of gathered digits and a maximum number of gathered digits;

a fourth item which represents an input of an end-digit;

a fifth item which represents whether an input of the end-digit is mandatory;

a sixth item which represents a critical digit length for judging as an AIN call; and a seventh item which represents which of an AIN call and a normal call is processed.

9. The method of claim 8, wherein the fifth and seventh items are flags.

10. The method of claim 5, wherein the number gathering information comprises:

a minimum number of gathered digits;

a maximum number of gathered digits; and an end-digit.

11. The method of claim 5, wherein the second AIN subscriber trigger searching further comprises:

checking whether the AIN subscriber trigger includes the NIT; and requesting an AIN service when the AIN subscriber trigger does not include the NTT.

12. The method of claim 1, wherein recognizing, comparing, judging, and searching are performed at a switch point.

13. A method for providing a service for an advanced intelligent network (AIN) service subscriber based on a prescribed number plan, comprising:

searching a trigger which corresponds to a detected AIN call;

judging whether the trigger is an AIN subscriber trigger;

checking whether a Number Translation Table (NT exists in the AIN subscriber trigger;

searching a subscriber group information of the AIN subscriber trigger when the NTT exists and detecting a Private Numbering Plan (PNP) identification number; and searching a PNP corresponding to the detected PNP identification number from the NTT and requesting a number gathering and AIN service based on a number gathering information of the searched PNP.

14. The method of claim 13, wherein the PNP identification number is a PNP identification number that corresponds to a subscriber group; and the AIN subscriber trigger further comprises a detecting point corresponding to the identification number of the PNP.

15. The method of claim 14, wherein the NTT is selectively included in the AIN subscriber trigger.

16. The method of claim 13, wherein the trigger which corresponds to the detected AIN call is one of the route identification number, service access code, AIN prefix, AIN subscriber trigger, detecting point specific trigger and trigger assigned trigger.

17. The method of claim 16, wherein the AIN subscriber trigger and detecting point specific trigger correspond to a subscriber data, and said trigger assigned trigger corresponds to an office data.

18. The method of claim 13, when the trigger which corresponds to the detected AIN call corresponds to one of the detecting point specific trigger and the trigger assigned trigger, further comprising a step for requesting an AIN service.

19. The method of claim 13, wherein the NTT comprises:

a first item which represents an identification number of the PNP defined for each subscriber group;

a second item which represents a prefix;

a third item which represents a minimum number of gathered digits and a maximum number of gathered digits;

a fourth item which represents an input of an end-digit;

a fifth item which represents whether an input of the end-digit is necessary;

a sixth item which represents a judgement digit length for judging as the AIN call; and a seventh item which represents which of an AIN call process and a normal call process is performed.

20. The method of claim 13, wherein said number gathering information comprises:

a minimum number of gathered digits;

a maximum number of gathered digits; and an end-digit.

21. The method of claim 13, wherein searching the trigger, determining, checking, searching the subscriber group information, searching the PNP, and requesting the number gathering is performed at a switch point.

22. A method of setting a private numbering plan for groups of subscribers in an advanced intelligent network, the setting of the private numbering plan for each group comprising:

setting an identification number of the private numbering plan;

setting a first code which represents a call number;

setting a minimum number of gathered digits and a maximum number of gathered digits;

setting an end-digit;

setting a second code which represents whether an input of the end-digit is mandatory;

setting a critical digit length for judging as an AIN call; and setting a flag which represents which of an AIN call and a normal call is processed.

23. A method for requesting an advanced intelligent network service, comprising:

recognizing an AIN call based on AIN trigger data;

gathering a first set of digits;

comparing the first set of digits with trigger criteria;

determining a trigger corresponding to the AIN call;

determining if the trigger is an AIN subscriber trigger based on subscriber group information of the trigger;

determining if the AIN subscriber trigger includes a number translation table;

detecting an identification number;

getting a second set of digits; and requesting an AIN service based on the second set of digits, the number translation table, and the identification number.

* * * * *